United States Patent [19]

Marz

[11] Patent Number: 5,617,475
[45] Date of Patent: Apr. 1, 1997

[54] SCRAMBLING AND DESCRAMBLING OF VIDEO SIGNALS USING HORIZONTAL LINE COMBINATIONS

[75] Inventor: Daniel Marz, Richboro, Pa.

[73] Assignee: General Instrument Corporation, G.I. Communications Division, Hatboro, Pa.

[21] Appl. No.: 342,301

[22] Filed: Nov. 18, 1994

[51] Int. Cl.$^6$ .................................................. H04L 9/00
[52] U.S. Cl. ............................. 380/14; 380/11; 380/17
[58] Field of Search ................................. 380/7, 11, 14, 380/17

[56] References Cited

U.S. PATENT DOCUMENTS

| | | | |
|---|---|---|---|
| 3,683,111 | 8/1972 | Southworth | 178/6 |
| 4,340,906 | 7/1982 | den Toonder et al. | 358/124 |
| 4,376,957 | 3/1983 | Dischert et al. | 358/334 |
| 4,389,671 | 6/1983 | Posner et al. | 358/124 |
| 4,398,214 | 8/1983 | Gargini | 380/7 |
| 4,405,942 | 9/1983 | Block et al. | 358/119 |
| 4,527,195 | 7/1985 | Cheung | 358/120 |
| 4,563,702 | 1/1986 | Heller et al. | 358/119 |
| 4,575,754 | 3/1986 | Bar-Zohar | 380/11 |
| 4,580,173 | 4/1986 | Dischert et al. | 358/310 |
| 4,600,942 | 7/1986 | Field et al. | 358/122 |
| 4,605,961 | 8/1986 | Frederiksen | 358/119 |
| 4,628,358 | 12/1986 | Robbins | 358/121 |
| 4,663,659 | 5/1987 | Blatter | 380/14 |
| 4,679,078 | 7/1987 | Wong et al. | 380/15 |
| 4,716,588 | 12/1987 | Thompson et al. | 380/20 |
| 4,736,420 | 4/1988 | Katznelson et al. | 380/11 |
| 4,742,544 | 5/1988 | Kupnicki et al. | 380/11 |
| 4,742,546 | 5/1988 | Nishimura | 380/35 |
| 4,870,682 | 9/1989 | Morrey et al. | 380/7 |
| 4,914,694 | 4/1990 | Leonard et al. | 380/5 |
| 4,916,736 | 4/1990 | Ryan | 380/11 |
| 4,924,498 | 5/1990 | Farmer et al. | 380/15 |
| 4,926,477 | 5/1990 | Paik | 380/15 |
| 5,321,748 | 6/1994 | Zeidler et al. | 380/14 |

FOREIGN PATENT DOCUMENTS 60-256286  12/1985  Japan ..................................... 380/14

OTHER PUBLICATIONS

NTC Report No. 7, Prepared by The Network Transmission Committee of the Video Transmission Engineering Advisory Committee, pp. 1–73, revised Jan. 1976.
EIA Standard, Electrical Performance Standards for Television Relay Facilities, Engineering Department, Electronic Industries Association, Sep. 1976.
Moroney et al., "The Videocipher," *IEEE*, pp. 297–302 (1984).
Cypress Semiconductor, Spec Sheet, CYM1422, 128K48 Static RAM Module, pp. 2–271–2–276.
Analog Devices, Spec Sheet, Hybrid Video Digital–To–Analog Converter, HDG–0807, pp. 2–467–2–470.
Texas Instruments, Spec. Sheet, Advance Information Dynamic RAMs, TMS44C251 262,144 by 4–Bit Multiport Video RAM, pp. 4–79–4–81, 1988.
Datel, Inc., Spec. Sheet, ADC–303 8–Bit Video Flash A/D Converter, pp. 1–27–1–29 and 1–32.

*Primary Examiner*—Salvatore Cangialosi
*Attorney, Agent, or Firm*—Marshall, O'Toole, Gerstein, Murray & Borun

[57] ABSTRACT

A plurality of video lines in a raster scan video image are scrambled by delaying a first video line in time equal to the horizontal line scan time for the raster scan video field to produce a delayed first video line. The delayed first video line is inverted to produce an inverted delayed first video line and one of the delayed first video line, the inverted delayed first video line and a null signal is added to a second horizontal video line to produce a horizontal line of a scrambled video signal. The scrambled horizontal lines of video information are descrambled by delaying a first scrambled horizontal video line in time equal to the horizontal line scan time for the raster scan video field to produce a delayed first scrambled video line. The delayed first scrambled video line is inverted to produce an inverted delayed first scrambled video line and one of the delayed first scrambled video line, the inverted delayed first scrambled video line and a null signal is added to a second scrambled horizontal video line and to a feedback signal to produce a descrambled horizontal video line.

38 Claims, 3 Drawing Sheets

SCRAMBLING AND DESCRAMBLING OF VIDEO SIGNALS USING HORIZONTAL LINE COMBINATIONS

TECHNICAL FIELD

The present invention relates generally to encoding and decoding of video information, and more particularly to a method and apparatus which secures the transmission of video signals so that only authorized persons can view or have access to the associated video information.

BACKGROUND ART

Various systems have been proposed and are in use for scrambling video signals, such as television signals, to secure transmission of the video information therein. Generally, these systems include a scrambler which alters the video signals in a predetermined manner before the video signals are propagated through a video channel associated with, for example, an RF, microwave, cable or other video communications system. At the receiving end of the video system, a descrambler reverses the scrambling process to assemble the scrambled video signals into their original order, sequence or state so that they can be suitably displayed for viewing on a television screen. Of course, if a receiver does not contain a suitable descrambler, the displayed video signals will be generally unintelligible and the information therein will be masked.

Thompson, et al., U.S. Pat. No. 4,716,588, discloses a multimode video signal scrambling system controlled by a central computer facility which scrambles each field of a video signal using one or more of several techniques including adding extraneous and confusing synchronizing (sync) pulses onto the video signal, compressing the amplitude of the video signal, alternatively inverting horizontal lines of the video signal in time to reverse the sequence thereof, removing horizontal sync pulses from the video signal, adding false leading edge sync pulses to horizontal lines of a video signal and shifting the amplitude of the active video information within a video signal in a predetermined direction so that a television receiver does not register or lock onto the active video information.

Cheung, U.S. Pat. No. 4,527,195, also discloses an apparatus for encoding and decoding video signals using multiple scrambling techniques including developing a scrambled video signal having horizontal sync pulses pseudorandomly placed on some of the horizontal lines of the video signal. This apparatus also pseudorandomly reverses the polarity of certain selected lines of video within each video field and shifts portions of video signals containing luminance and chrominance information in amplitude to mask such information.

Robbins, U.S. Pat. No. 4,628,358, discloses a video scrambling system which inverts video information within a video signal about a predetermined inversion level during selected lines of the video signal thereby to encrypt or scramble the video signal. This system also reverses the polarity of the selected audio portions of a video signal using a keyed pseudorandom generator.

Field, et al., U.S. Pat. No. 4,600,942, discloses an apparatus for scrambling a television signal which stores particular segments of each horizontal line of a video signal in an analog storage device and retrieves these horizontal line segments in a cyclic manner to re-arrange the horizontal line and, thereby, scramble the television signal. The retrieval of the information from the storage devices is carried out on a selective basis in accordance with a pseudorandom signal that is independently generated at each of the encoding and decoding stations.

Ryan, U.S. Pat. No. 4,916,736, discloses a video scrambling system which shifts active video information in time with respect to the horizontal sync pulse and the color burst signal within each horizontal line of the video signal. This system includes an analog-to-digital (A/D) converter which digitizes and stores the video signal in a memory and a digital-to-analog (D/A) converter which reads the video information out of the memory for transmission through a communications channel. A controller controls the sequence in which the information is read out of the memory and shifts the digitized active video information in time with respect to the horizontal sync pulse and the color burst signal.

Although many methods of scrambling a video signal are known, these methods usually require complicated timing and control techniques and use expensive circuitry. Furthermore, none of these methods arithmetically combines video information from separate horizontal lines of a video signal to produce a scrambled video signal.

SUMMARY OF THE INVENTION

In accordance with the present invention, a video scrambling and descrambling technique provides a high degree of masking of the video information contained in a raster scan video field using arithmetic combinations of portions of separate horizontal lines of a video signal. According to one aspect of the present invention, a method of scrambling a video signal having first and second components, such as first and second horizontal lines, includes the steps of delaying the first component in time to produce a delayed first component and combining the second component with the delayed first component to produce a scrambled video signal.

The delayed first component, which may comprise the active video portion of a first horizontal line of the video signal, may be added to the second component, which may comprise the active video portion of a second horizontal line of the video signal. Likewise, one of the first delayed component and the second component may be subtracted from the other of the first delayed component and the second component to produce the scrambled video signal. More particularly, a delayed first horizontal line may be inverted to produce an inverted delayed first horizontal line and either the delayed first horizontal line or the inverted delayed first horizontal line may be added to a second horizontal line to produce the scrambled video signal. Preferably, the first horizontal line is delayed an amount of time equal to the horizontal line scan time of the raster scan video field. A scrambling signal may be added onto the first and second components in order to provide a further level of scrambling to the scrambled video signal. Also, scrambling information indicative of the way in which the video components were combined may be encoded onto the scrambled video signal prior to transmission of the scrambled video signal through a channel.

According to another aspect of the present invention, a video signal descrambling technique descrambles a scrambled video signal having first and second scrambled components, such as first and second scrambled horizontal lines, to produce a portion of a descrambled video signal having first and second components, such as first and second descrambled horizontal lines. This technique includes delaying the first scrambled component in time, combining the delayed first scrambled component with the second scrambled component and a feedback signal to produce the first component of the descrambled video signal. The second component of the descrambled video signal is delayed in time to produce the feedback signal.

Preferably, the first scrambled component, i.e., the first scrambled horizontal line, is delayed an amount of time equal to the horizontal line scan time of the raster scan video field, and the second component of the descrambled video signal, i.e., the second horizontal line of the descrambled video signal, is delayed an amount of time equal to twice the horizontal line scan time of the raster scan video field.

The second scrambled horizontal line and the delayed first scrambled horizontal line may be added together or subtracted from one another by identifying one of the second scrambled horizontal line and the delayed first scrambled horizontal line as a first signal and identifying the other of the second scrambled horizontal line and the delayed first scrambled horizontal line as a second signal. Thereafter, the first signal may be inverted and one of the first signal and the inverted first signal may be added to the second signal. Furthermore, the delayed second horizontal line of the descrambled video signal may be inverted and one of the delayed second horizontal line of the descrambled video signal and the inverted delayed second horizontal line of the descrambled video signal may be chosen as the feedback signal.

The technique for descrambling a scrambled video signal may also include removing a scrambling signal from one or both of the first and second horizontal lines of the descrambled video signal. Scrambling information indicative of the manner in which the scrambled video signal was generated may also be obtained from the scrambled video signal and used to control the process of combining the delayed first horizontal line, the second horizontal line and the feedback signal.

According to another aspect of the present invention, a method and apparatus for scrambling a plurality of video lines in a raster scan video image for a video field includes delaying a first video line an amount of time equal to the horizontal line scan time for the raster scan video field to produce a delayed first video line and inverting the delayed first video line to produce an inverted delayed first video line. The method and apparatus also selects one of (a) the delayed first video line, or (b) the inverted delayed first video line, or (c) a null signal, such as an electrical ground signal, and adds a second video line to the selected one of (a), (b) or (c). This process is repeated for each of the plurality of video lines to produce the scrambled video signal.

According to a still further aspect of the present invention, a method and apparatus for descrambling a plurality of scrambled video lines in a raster scan video image for a video field delays a first scrambled video line an amount of time equal to the horizontal line scan time for the raster scan video field to produce a delayed first scrambled video line and inverts the delayed first scrambled video line to produce an inverted delayed first scrambled video line. The method and apparatus also selects one of (a) the delayed first scrambled video line, or (b) the inverted delayed first scrambled video line, or (c) a null signal, such as an electrical ground signal, and adds a second scrambled video line to the selected one of (a), (b) , or (c) and to a feedback signal to produce a descrambled horizontal video line. The feedback signal is developed from a previously descrambled horizontal video line by delaying the previously descrambled horizontal video line, inverting the delayed descrambled horizontal video line, and choosing one of (a) the delayed descrambled video line, or (b) the inverted delayed descrambled horizontal video line, or (c) a null signal, such as an electrical ground signal, as the feedback signal. The apparatus repeats this process for each of the plurality of horizontal video lines in the video field.

According to a still further aspect of the present invention, a method of transmitting a video signal having first and second original components to develop a reproduced video signal having first and second reproduced components includes the steps of delaying the first original component of the video signal in time to produce a delayed first original component and combining the second original component of the video signal with the delayed first original component to produce a portion of a scrambled video signal. The method also includes the steps of transmitting the scrambled video signal having first and second scrambled components and receiving the transmitted scrambled video signal. Upon receiving the transmitted scrambled video signal, the method delays the first scrambled component of the scrambled video signal in time and combines the delayed first scrambled component, the second scrambled component and a feedback signal to develop the first reproduced component of the reproduced video signal. The method also includes the step of delaying the second reproduced component of the reproduced video signal to produce the feedback signal.

DESCRIPTION OF THE PREFERRED EMBODIMENT

Figure 1:
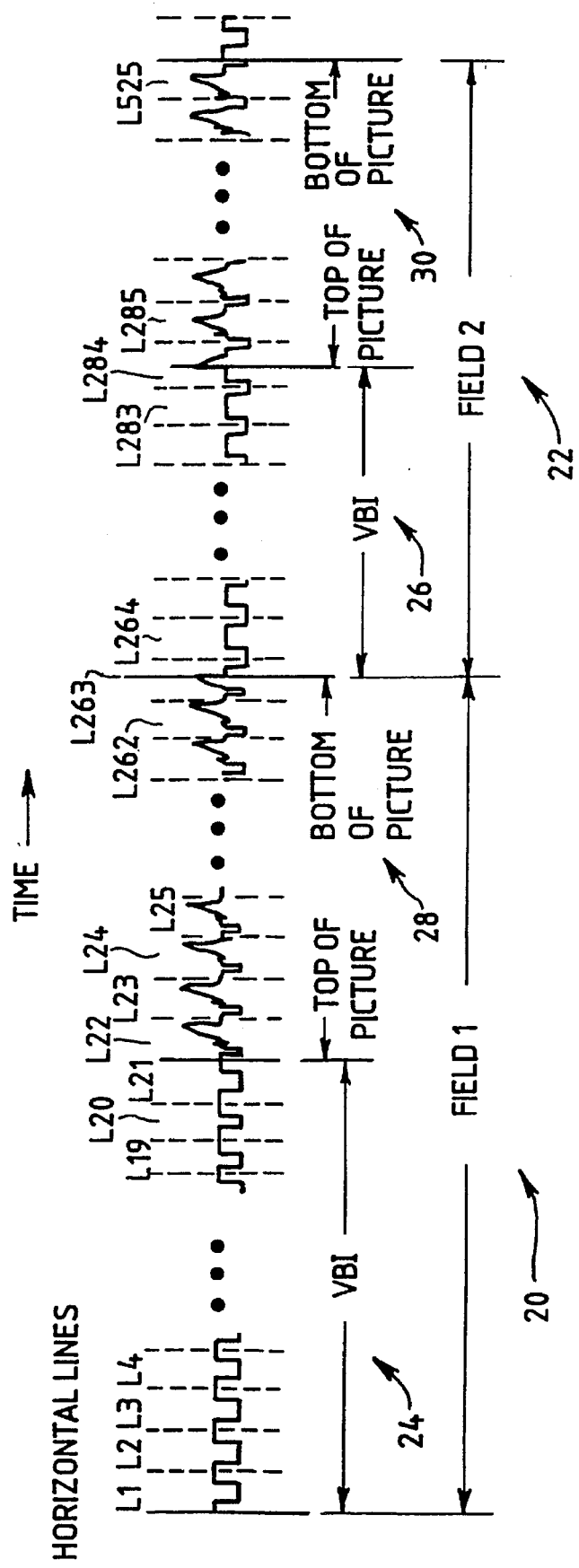
FIG. 1 is a waveform diagram illustrating a single frame of a typical television video signal.

Referring now to FIG. 1, a typical raster scan frame of a television video signal, which may be developed and transmitted according to any standard including, for example, Electronics Industries Association (EIA) standard RS-250-B or Network Transmission Committee standard NTC-7, is illustrated. Typically, each frame of a television video signal includes 525 horizontal lines of raster scan video information (marked in FIG. 1 as L1, L2, etc.) and is divided into two video fields, 20 and 22, each of which includes 262½ horizontal lines of video information. Each of the fields 20 and 22 includes a vertical blanking interval (VBI) 24 and 26, respectively, and a video portion 28 and 30, respectively. Each of the VBI's 24 and 26 includes twenty-one horizontal lines of flat field (black) video information which are not displayed on the television receiver. Typically, one or more of the first ten horizontal lines of each of the VBI's 24 and 26 include standardized sets of equalizing pulses and/or vertical synchronizing pulses which are used by a television to synchronize the television beam with the incoming video signal. The horizontal lines of the VBI's 24 and 26 may also include closed caption information, audio information, copyright information, scrambling codes and/or any other desired information.

Each of the video portions 28 and 30 includes 241½ horizontal lines of raster scan video information having active video signals which are displayed consecutively downwardly on a television screen such that the first horizontal line of video information within each of the video portions 28 and 30 is displayed at the top of the television screen and the last horizontal line within each of the video portions 28 and 30 is displayed at the bottom of the television screen. Furthermore, the horizontal lines of the video portions 28 and 30 are interleaved with each other so that, for example, horizontal line L285 is displayed directly below horizontal line L22 and directly above horizontal line L23. Furthermore, as indicated in FIG. 1, the horizontal lines of the video portion 30 are offset from the horizontal lines of the video portion 28 by one-half of a horizontal line. As a result, the active video information of the first field 20 begins at the top left-hand corner of the television screen while the active video information of the second field 22 begins at the top center portion of the television screen.

Figure 2:
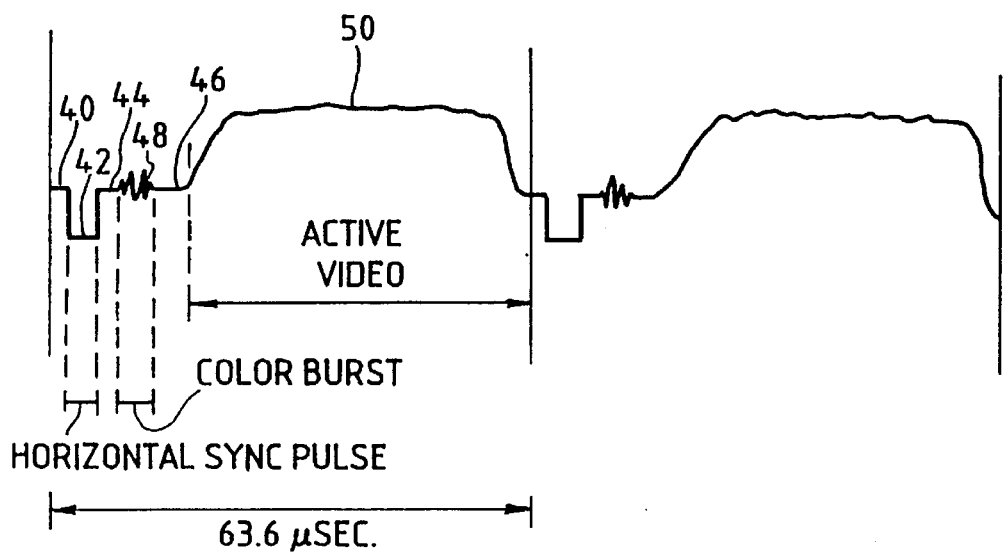
FIG. 2 is a waveform diagram illustrating two horizontal lines of the video signal shown in FIG. 1.

Referring now to FIG. 2, each horizontal line of video information within the video portions 28 and 30 includes a plurality of components including a front porch 40, a horizontal sync pulse 42, a breezeway 44 and a back porch 46, all of which comprise horizontal synchronizing signals. Furthermore, each horizontal line within the video portions 28 and 30 includes a color burst signal 48 and an active video signal 50 containing active video information which is displayed on a television screen. Typically, each horizontal line of a video signal is approximately 63.6 microseconds long. As a result, the horizontal line scan time of the raster scan video field is approximately 63.6 microseconds in duration.

Figure 3:
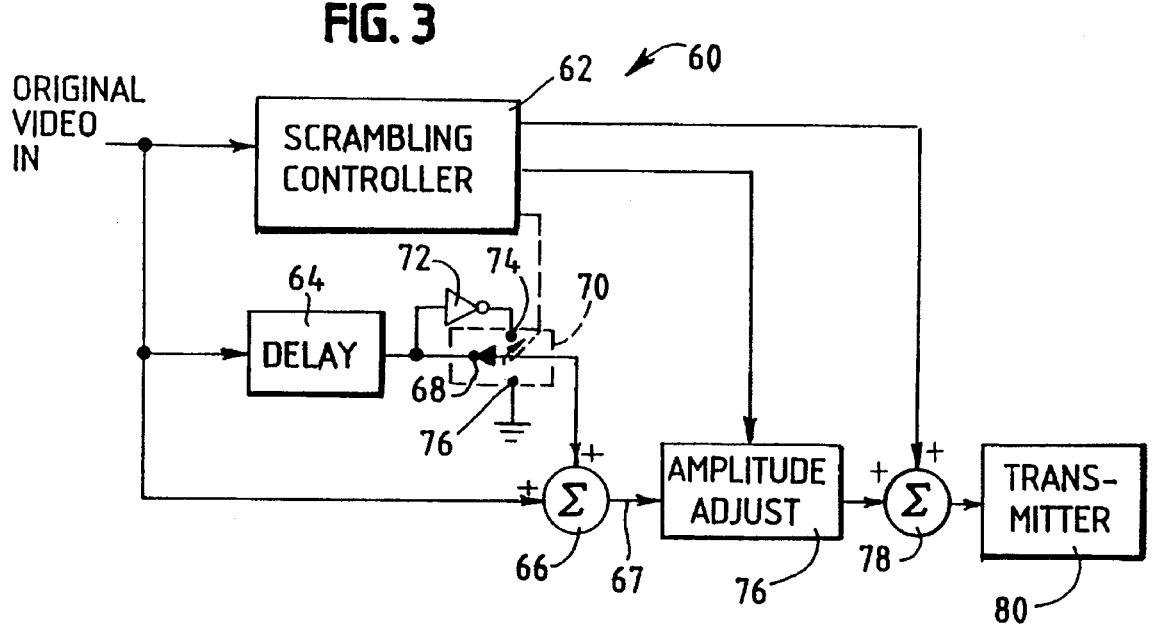
FIG. 3 is a combined block and schematic diagram of a first embodiment of a scrambling unit which scrambles a video signal according to the present invention.

Referring now to FIG. 3, a scrambling unit 60 scrambles a television video signal by alternatively (1) adding one or more portions of one horizontal line of video information to one or more portions of a second horizontal line of video information, or (2) subtracting the one or more portions of one horizontal line of video information from one or more portions of a second horizontal line of video information, or (3) passing a horizontal line of video information unaltered to produce a horizontal line of a scrambled video signal.

In accordance therewith, an original video signal is provided to a scrambling controller 62 which controls the operation of the scrambling unit 60. The scrambling controller 62 decodes the incoming video signal to determine the exact portion of the video signal present at the input of the scrambling controller 62. The scrambling controller 62 may include a horizontal and vertical sync detector (not shown) which detects the horizontal and vertical sync pulses present in each frame and/or each horizontal line of the incoming video signal. The scrambling controller 62 may also include a microprocessor and/or a timing device (not shown) which resets at the beginning of each frame and/or horizontal line of the incoming video signal. The microprocessor determines which portion of the frame and/or horizontal line of the video signal is present at the input of the scrambling controller 62 at any particular time by, for example, comparing the output of the timing device with markers stored in memory which indicate which portion of the video signal corresponds to each particular timer output. The microprocessor uses this comparison to control the operation of the scrambling unit 60 as described hereinafter.

The original video signal is also delivered to a delay line 64 and to a summer 66. The delay line 64, which may comprise any analog or digital delay line, delays the original video signal by one horizontal video line scan time, i.e., 63.6 microseconds, to produce a delayed horizontal line of video information. The delayed horizontal line of video information is delivered to a first input 68 of a switch 70 and is also inverted by an inverter 72 to develop an inverted delayed horizontal line of video information which is delivered to a second input 74 of the switch 70. A third input 76 of the switch 70 is connected to ground so that a null signal, i.e., a ground or zero reference voltage signal, appears at the switch input 76.

The switch 70 is controlled by the scrambling controller 62 to connect one of (1) the delayed horizontal line of video information present at the switch input 68, (2) the inverted delayed horizontal line of video information present at the switch input 74, or (3) the null signal present at the switch input 76, to the summer 66. The scrambling controller 62 may operate the switch 70 in any desired manner, including, for example, according to a predetermined sequence or a random or pseudorandom code generated by the scrambling controller 62.

The summer 66 adds the horizontal line of video information present at the input of the scrambling unit 60 to the signal passed by the switch 70 to develop a scrambled video signal on an output line 67 comprising one of (1) the addition of the horizontal line of video information present at the input of the scrambling controller 62 and the previous horizontal line of video information (when the switch 70 is connected to the switch input 68), (2) the subtraction of the previous horizontal line of video information from the horizontal line of video information present at the input of the scrambling controller 62 (when the switch 70 is connected to the switch input 74), or (3) the original video signal present at the input of the scrambling controller 62 (when the switch 70 is connected to the switch input 76).

An amplitude adjusting circuit 76 adjusts the amplitude of the scrambled video signal developed by the summer 66 to add a further level of scrambling thereto and to provide a scrambled video signal having an amplitude within the limits of the standard under which the scrambled video signal is to be transmitted through a channel. As indicated in FIG. 3, the amplitude adjusting circuit 76 and, therefore, the particular level of amplitude adjusting performed on the scrambled video signal, is controlled by the scrambling controller 62.

A summer 78 then adds scrambling information developed by the scrambling controller 62 and indicative of, for example, the operation of the switch 70 and/or the amplitude adjusting circuit 76, to the amplitude adjusted, scrambled video signal for use by a descrambling unit to decode the scrambled video signal. The scrambled video signal is then delivered to a transmitter 80 for transmission through a channel.

Preferably, the scrambling controller 62 provides scrambling information to the summer 78 when, for example, horizontal lines within one or both of the VBI's 24 and/or 26 are present at the summer 78 thereby to encode the VBI's of scrambled video signal with the scrambling information. The scrambling information may, however, be encoded onto any desired portion of the scrambled video signal and, furthermore, may be modulated onto the scrambled video signal in any other desired manner. Thus, for example, the summer 78 may be replaced with a modulator which modulates the audio signal associated with each horizontal line of the scrambled video signal with the scrambling information.

Although the scrambling unit 60 can scramble, i.e. add or subtract, entire horizontal video lines, (including the horizontal synchronizing signals, the color burst signals and/or the active video signals) or any combination thereof, preferably, the scrambling unit 60 only adds and/or subtracts the active video portions of a horizontal line of video information from the active video portion of the previous horizontal line of video information to develop the scrambled video signal. When less than the entire horizontal line is added or subtracted to develop the scrambled video signal, the scrambling controller 62 passes the unscrambled portions unaltered by connecting the switch 70 to the null signal present at the switch input 76 when the unscrambled portions of the video signals are present at the input of the scrambling controller 62. Thus, for example, when the scrambled video signal is developed by combining only the active video portions of consecutive horizontal lines, the switch 70 is connected to the null signal at the switch input 76 when any of the horizontal lines in the VBI's 24 and 26 are present at the input of the scrambling unit 60 and when the horizontal synchronizing signals and the color burst signal of each horizontal line within the video portions 28 and 30 are present at the input of the scrambling unit 60.

Although the scrambling unit 60 has been described as inverting the delayed horizontal video line to subtract the delayed horizontal video line from the horizontal video line present at the input of the scrambling controller 62, the scrambling unit 60 could, instead, subtract the horizontal line of video information present at the input of the scrambling controller 62 from the delayed horizontal video line by, for example, inverting the horizontal video line present at the input of the scrambling controller 62 and adding this inverted signal to the delayed horizontal video line developed by the delay line 64.

Still further, although the scrambling controller 62 has been described as adding and subtracting horizontal lines to or from one another, any other arithmetic combinations could be performed instead or in addition thereto, including, for example, multiplication and division. Alternatively, a less complex scrambling controller could provide only one of these arithmetic combining functions to scramble the video signal. Moreover, the delay line 64 of the scrambling unit 60 could delay a horizontal video signal by more than one horizontal line scan time so that non-consecutive horizontal lines of video information are combined with one another by the scrambling unit 60.

Figure 4:
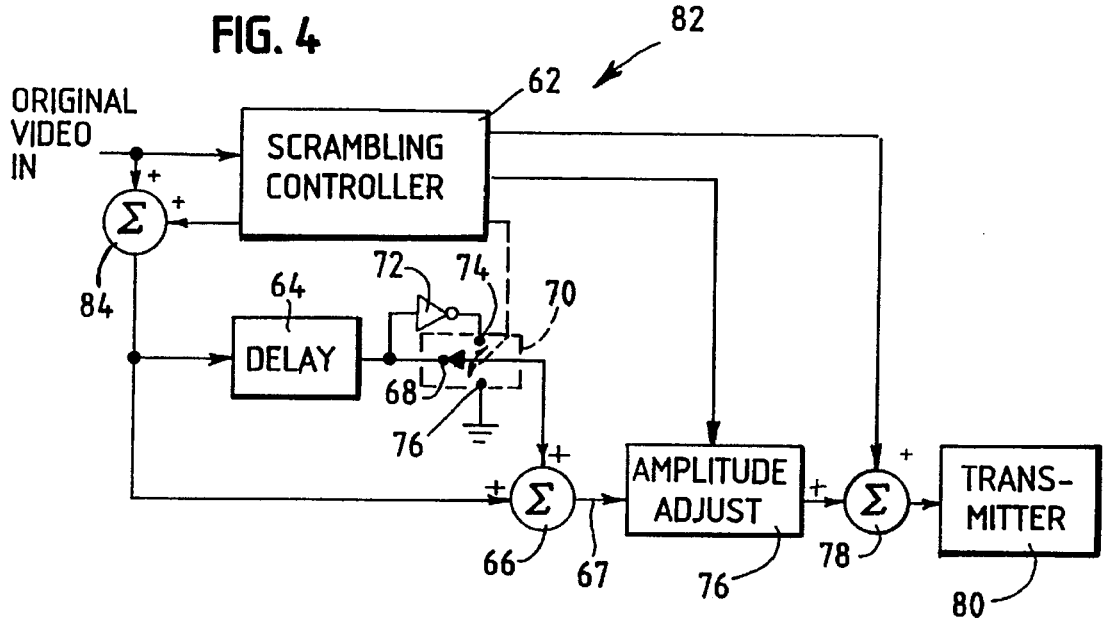
FIG. 4 is a combined block and schematic diagram of a second embodiment of a scrambling unit which scrambles a video signal according to the present invention.

Referring now to FIG. 4, a scrambling unit 82 is illustrated. The scrambling unit 82 is similar to the scrambling unit 60, with like components numbered the same as the scrambling unit 60, except that the scrambling unit 82 includes a summer 84 connected in front of the delay line 64 and the summer 66. The summer 84 adds a scrambling signal, which is developed by the scrambling controller 62, onto each horizontal line of the original video signal before that horizontal line of the original video signal is delivered to the delay line 64 and to the summer 66. As a result, the summer 84 adds an additional level of masking to the scrambled video signal developed by the summer 66. The scrambling controller 62 can deliver any desired scrambling signal to the summer 84 including, for example, a predetermined scrambling signal or a randomly or pseudorandomly developed scrambling signal. In the later cases, the scrambling controller 62 can further encode the scrambled video signal, via the summer 78, with an indication of the scrambling signal added onto each horizontal line of the original video signal by the summer 84.

Figure 5:
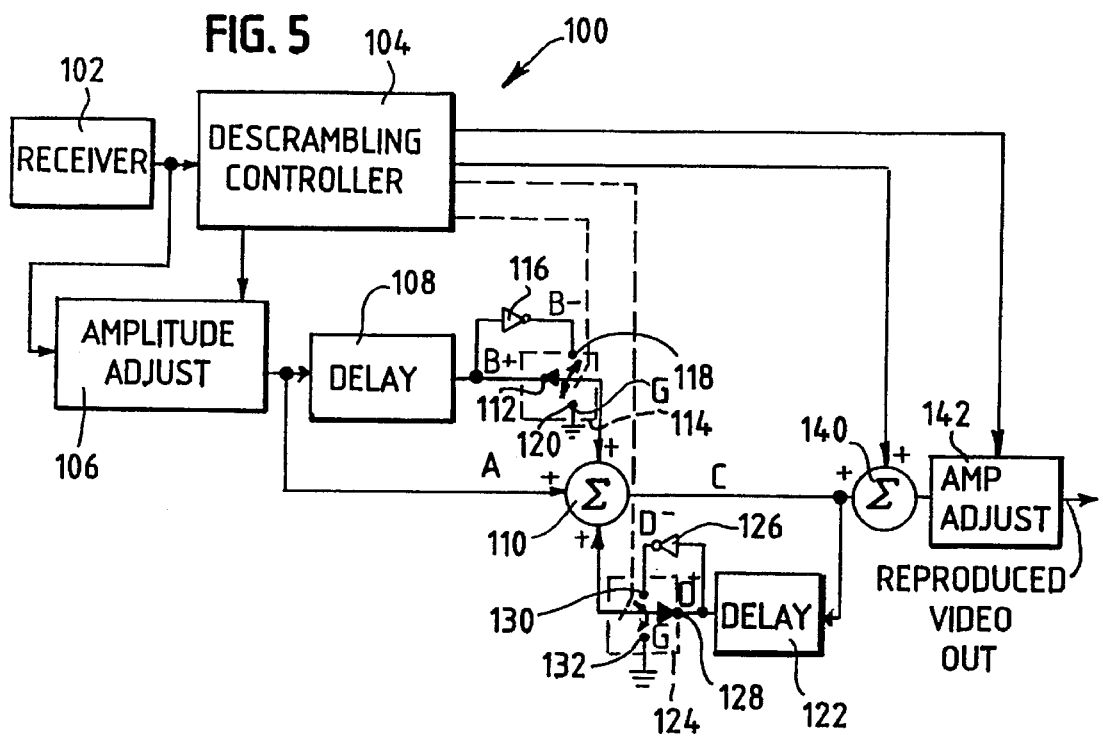
FIG. 5 is a combined block and schematic diagram of a descrambling unit which descrambles a scrambled video signal according to the present invention.

Referring now to FIG. 5, a descrambling unit 100 is shown connected to a receiver 102. The receiver 102 receives the scrambled video signal produced by one of the scrambling units 60 or 82 and delivers the scrambled video signal to a descrambling controller 104 and to an amplitude adjusting circuit 106. The descrambling controller 104 may comprise a horizontal and/or vertical sync detector and a microprocessor or other circuitry which recognizes the portions of the incoming scrambled video signal and which controls the operation of the descrambling unit 100 in response thereto. The descrambling controller 104 may also include a timer which is reset by the vertical and/or horizontal sync detector and which indicates the portion of the incoming scrambled video signal present at the input of the descrambling unit 100.

Still further, the descrambling controller 104 may include a demodulator capable of extracting the scrambling information indicative of the way in which the scrambled video signal was generated which has been encoded onto the scrambled video signal. The demodulator delivers this information to the microprocessor for use in reproducing the original video signal. The information indicative of the way in which the scrambled video signal was produced may, instead, be stored in a memory associated with the descrambling controller 104, downlinked to the scrambling controller 104 via a different communications channel or delivered to the descrambling controller 104 in any other desired manner.

The descrambling controller 104 controls the operation of the amplitude adjusting circuit 106 to reverse the amplitude adjusting performed by the amplitude adjusting circuit 76 of the scrambling unit 60 or 82. The output of the amplitude adjusting circuit 106 comprises an amplitude adjusted scrambled video signal, marked in FIG. 5 as a signal A, which is delivered to a delay line 108 and to a summer 110.

The delay line 108, which may comprise any desired digital or analog delay line, delays the scrambled video signal developed by the amplitude adjusting circuit 106 by same amount as the delay line 64 of the scrambling units 60 and 82. Thus, preferably, the delay line 108 delays the video signal for one horizontal line scan time, i.e., 63.6 microseconds. The delay line 108 produces a delayed scrambled video signal, marked in FIG. 5 as a signal B+, which is delivered to a switch input 112 of a switch 114 and is also delivered to an inverter 116. The inverter 116 inverts the delayed scrambled video signal B+ to develop an inverted delayed scrambled video signal B− which is delivered to a switch input 118 of the switch 114. A switch input 120 of the switch 114 is connected to ground such that a null signal G (i.e., a ground or zero voltage reference signal) is developed at the switch input 120.

The output of the switch 114, i.e., one of the signals B+, B− or G, is delivered to the summer 110 where it is combined with the signal A and a feedback signal to develop a descrambled video signal C. The descrambled video signal C substantially comprises the video signal delivered to the summer 66 of the scrambling units 60 and 82 and is provided to a feedback loop comprising a delay line 122, a switch 124 and an inverter 126 to produce the feedback signal.

The delay line 122 delays the descrambled video signal C for twice the amount of time as the delay time of the delay line 108, i.e., twice the horizontal line scan time of the original video signal. The output of the delay line 122, marked in FIG. 5 as a signal D+, is delivered to an input 128 of the switch 124 and is also delivered to the inverter 126. The inverter 126 develops an inverted version of the delayed descrambled video signal C, marked in FIG. 5 as a signal D−, and delivers this signal to an input 130 of the switch 124. An input 132 of the switch 124 is connected to ground to produce a null signal G (i.e., a ground or zero voltage reference signal) at the input 132.

The operation of both of the switches 114 and 124 is controlled by the descrambling controller 104, as described hereinafter, so that, as noted above, signal C comprises a substantial replica of the signal developed by the summer 84 of the scrambling unit 82, i.e., the original video signal having a scrambling signal added thereto, or a substantial replica of the original video signal delivered to the scrambling unit 60. The signal C, however, will still include any scrambling information which may have been encoded onto the scrambled video signal.

The descrambled video signal C is then delivered to a summer 140 which adds an inverted replica of the scrambling signal (which was added to the original video signal by the summer 84 in the scrambling unit 82) to subtract the scrambling signal from the video signal C and to produce a descrambled video signal comprising a substantial reproduction of the original video signal. Of course, if the scrambling system 60 of FIG. 3 has been used to develop the scrambled video signal, the summer 140 is unnecessary.

The summer 140 also allows the descrambling controller 104 to remove any other scrambling information or other extraneous signals which may have been added to the scrambled video signal by supplying an inverse of the signal to be eliminated to the summer 140 at the appropriate time. Of course, if the signal C comprises a portion of the video signal which has not been scrambled, for example, one of the VBIs 24 or 26 or the horizontal sync signals of a scrambled horizontal line of video, the descrambling controller 104 provides a ground signal to the summer 140 when these portions of the signal C are present at the input of the summer 140 to pass these portions of the signal C unaltered.

The output of the summer 140, which comprises a substantial replica of the original video signal, is provided to an amplitude adjusting circuit 142 which adjusts the amplitude of the descrambled video signal to the proper level for use in a television. The amplitude adjusting circuit 142 then delivers the descrambled video signal to a television (not shown) for display.

In operation, the descrambling controller 104 recognizes when the portions of the incoming scrambled video signal which have been scrambled are present and, if desired, reads information from the scrambled video signal indicative of the way in which the scrambled video signal has been scrambled. More specifically, the descrambling controller 104 decodes the way in which the last two horizontal lines of the scrambled video signal were generated, i.e., the scrambled video signals marked in FIG. 5 as signals A and B+, and uses this information to control the operation of the switches 114 and 124 as indicated by Table 1 to descramble the scrambled video signal.

When the scrambled video signal has only been scrambled during particular portions thereof, for example, the active video portions of each of the horizontal lines within the video portions 28 and 30, the descrambling controller 104 controls the switches 114 and 124 such that the other portions of the incoming scrambled video signal, i.e., the horizontal lines within the VBIs 24 and 26 and/or the horizontal synchronizing signals and the color burst signal of each horizontal line, are passed through the summer 110 while the switches 114 and 124 are connected to the ground signals G through switch inputs 120 and 132, respectively.

On the other hand, when a scrambled portion, such as an active video signal within a horizontal line of the video portions 28 or 30, is present at the input of the descrambling unit 100, the descrambling controller controls the switch 114 to be connected to one of the signals B+, B− or G at the switch inputs 112, 118 or 120, respectively, and controls the switch 124 to be connected to one of the signals D+, D− or G at the switch inputs 128, 130 or 132, respectively, according to the truth table given in Table 1.

TABLE 1

| Operation Of Scrambling Unit Switch 70 With Respect To The Signal B+ | Operation Of Scrambling Unit Switch 70 With Respect To The Signal A | Operation Of Switch 114 | Operation Of Switch 124 |
| --- | --- | --- | --- |
| + | + | B− | D+ |
| + | − | B+ | D− |
| + | G | G | G |
| − | + | B− | D− |
| − | − | B+ | D+ |
| − | G | G | G |
| G | + | B− | G |
| G | − | B+ | G |
| G | G | G | G |

The first column of Table 1 expresses the operation of the switch 70 of the scrambling unit 60 or 82 when producing the horizontal line of the scrambled video present at the output of the delay line 108, i.e., the signal B+. The second column of Table 1 expresses the operation of the switch 70 of the scrambling unit 60 or 82 when producing the horizontal line of the scrambled video signal present at the input of the scrambling unit 100, i.e., the signal A. In these columns, the symbol "+" indicates that the switch 70 was connected to the switch input 68 (i.e., the positive input), the symbol "−" indicates that the switch 70 was connected to the switch input 74 (i.e., the negative or inverting input) and the symbol "G" indicates that the switch 70 was connected to the switch input 76 (i.e., the ground or null signal input). The third and fourth columns of Table 1 express the operation of the switches 114 and 124, respectively, by identifying the signals passed by the switches 114 and 124 under the conditions of the first two columns. In the third and fourth column, and as indicated above, the signal B+ represents the output of the delay line 108, the signal B− represents the output of the inverter 116, the signal D+ represents the output of the delay line 122, the signal D− represents the output of the inverter 126 and the signal G represents the null or ground signals present at the switch inputs 120 and 132.

Thus, as indicated in Table 1, when the switch 70 of the scrambling unit 60 or 82 is connected to the output of the delay line 64 through the switch input 68 (i.e., the positive input) to produce both of the most recent horizontal lines of the scrambled video signal, i.e., the scrambled signals A and B+, then the switch 114 of the descrambling unit 100 should be connected to the negative input 118 (i.e., to the signal B−), while the switch 124 should be connected to the positive input 128 (i.e., to the signal D+). Also, for example, if the switch 70 of the scrambling unit 60 or 82 is connected to the positive input 68 to produce the signal B+, and the switch 70 is connected to the negative input 74 to produce the signal A, then the switch 114 should be connected to the positive input 112, i.e., to the signal B+, and the switch 124 should be connected to the negative input 130, i.e., to the signal D−. As a further example, when the signal A is developed by adding a null signal G to the original video signal, both of the switches 114 and 124 of the descrambling unit 100 should be connected to the ground or null signal G.

Because the descrambled video signal C is fed back to the summer 110 to produce subsequent horizontal lines of the descrambled video signal C, it is important that initially, for example, when the descrambling unit 100 is first turned on, the signal C is a substantial reproduction of the original video signal delivered to the summer 66 of the scrambling units 60 and 82. Therefore, at least one horizontal line within each frame of a scrambled video signal should be left unaltered so that the descrambling unit 100 can properly sync up to the scrambled video signal, i.e., produce an initial signal C which is a reproduction of the signal scrambled by the summer 66 of the scrambling units 60 and 82, and which, when fed back as a feedback signal to the summer 110, operates to decode subsequent horizontal lines of the scrambled video signal correctly. This unscrambled horizontal video line can be located at any desired position within a frame of the scrambled video signal including being within one or both of the VBIs 24 and/or 26.

In the situation where only active video signals within the video portions 28 and 30 are combined to produce the scrambled video signal, the first horizontal line of each of the video portions 28 and 30 within a frame of the scrambled video signal is preferably passed through the scrambling units 60 and/or 82 by adding a null or ground signal thereto. In this manner, the descrambling unit 100 can sync up to the first scrambled horizontal line within each of the video portions 28 and 30 by simply connecting the switches 114 and 124 to the null signals G at the switch inputs 120 and 132, respectively. This operation ensures that the first horizontal line of the descrambled video signal C within each of the video portions 28 and 30 is a substantial reproduction of the video signal scrambled by the summer 66 of the scrambling units 60 and 82. Furthermore, in this case, the switch 124 should be connected to the null signal G at the switch input 132 when the second horizontal line of the scrambled video signal within each of the video portions 28 and 30 is present at the input of the summer 110 to decode the second horizontal line of scrambled video within the video portions 28 and 30 properly.

Although Table 1 has been developed for the situation in which the delay line 64 of the scrambling units 60 and 82 and the delay line 108 of the descrambling unit 100 delay a horizontal line of video information by one horizontal line scan time and the delay line 122 of the descrambling unit 100 delays a horizontal line of the descrambled video signal by twice the horizontal line scan time, similar truth tables can be developed according to the principals set forth herein for situations in which the delay lines 64, 108, and 122 delay the associated signals by other amounts. Furthermore, similar scrambling units and descrambling units could be developed, using the principles described herein, which combine video signals from three or more horizontal lines of a video signal to scramble and descramble the video signal.

Although the scrambling units 60 and 82 and the descrambling unit 100 have been described as including analog components, one skilled in the art could easily substitute digital components therefor. For example, in the scrambling units 60 and 82, an analog to digital (A/D) convertor could be used to convert the original video signal into digital form while a microprocessor, responsive to the digitized video signals, could scramble the video signal according to the principles described herein to produce a digitized scrambled video signal. The digitized scrambled video signal could then be converted to analog by a digital to analog (D/A) convertor and transmitted through a channel. In such a system, a microprocessor, responsive to a digital version of the original video signal, could store the original video signal in a random access memory (RAM) for one horizontal line scan time. The microprocessor could then (1) add the stored digital delayed horizontal video line to a digitized version of the horizontal video line present at the input of the scrambling unit, (2) subtract one of the current digitized version of the horizontal video line present at the input of the scrambling unit and the stored digital delayed horizontal video line from the other of the current digitized version of the horizontal video line present at the input of the scrambling unit and the stored digitized delayed horizontal video line, or (3) pass the digitized version of the horizontal video line present at the input of the scrambling unit unaltered, to produce the digitized scrambled video signal. The microprocessor could also digitally encode the scrambling information onto the digital scrambled video signal.

Likewise, in the descrambling unit 100, the output of the receiver 102 could be converted from analog to digital in an A/D convertor and supplied to a microprocessor which would recognize the scrambling information encoded onto the digitized scrambled video signal. The microprocessor could then add or subtract previous digitized horizontal lines of video information stored in a RAM and add or subtract previously descrambled video signals to or from the horizontal line of video information present at the input of the descrambling unit to produce a digitized version of the descrambled video signal. The digitized descrambled video signal could then be amplitude adjusted and converted from digital to analog in a D/A convertor.

The foregoing detailed description has been given for clearness of understanding only, and no unnecessary limitations should be understood therefrom, as modifications will be obvious to those skilled in the art.

What is claimed is:

1. A method of scrambling a video signal having first and second components to produce a scrambled video signal, comprising the steps of:

delaying the first component in time to produce a delayed first component; and combining the second component with the delayed first component to produce the scrambled video signal.

2. The method of claim 1, wherein the step of combining includes the step of adding the second component to the delayed first component.

3. The method of claim 1, wherein the step of combining includes the step of subtracting one of the delayed first component and the second component from the other of the delayed first component and the second component.

4. The method of claim 1, wherein the first component comprises an active video portion of a first horizontal video line and the second component comprises an active video portion of a second horizontal video line.

5. A method of descrambling a scrambled video signal having first and second scrambled components to produce a first component of a descrambled video signal having first and second components, comprising the steps of:

delaying the first scrambled component in time;

combining the delayed first scrambled component, the second scrambled component and a feedback signal to produce the first component of the descrambled video signal; and delaying the second component of the descrambled video signal in time to produce the feedback signal.

6. The method of claim 5, wherein the step of combining includes the steps of identifying one of the second scrambled component and the delayed first scrambled component as a first signal, identifying the other of the second scrambled component and the delayed first scrambled component as a second signal, inverting the first signal, choosing one of the first signal and the inverted first signal and adding the chosen one of the first signal and the inverted first signal to the second signal.

7. The method of claim 6, wherein the step of combining further includes the steps inverting the delayed second component of the descrambled video signal, choosing one of the delayed second component and the inverted delayed second component and adding the chosen one of the delayed second component and the inverted delayed second component to the second signal.

8. The method of claim 5, wherein the first scrambled component comprises an active video portion of a first scrambled horizontal video line and the second scrambled component comprises an active video portion of a second scrambled horizontal video line.

9. A method of scrambling a plurality of video lines in a raster scan video image for a video field comprising the steps of:
(1) delaying a first video line in a time equal to the horizontal line scan time for the raster scan video field to produce a delayed first video line;
(2) inverting the delayed first video line to produce an inverted delayed first video line;
(3) selecting one of,
  (a) the delayed first video line, or
  (b) the inverted delayed first video line, or
  (c) a zero-level signal
(4) adding a second video line to the selected one of (a), (b), or (c); and
(5) repeating steps (1)–(4) for each of the plurality of video lines of the video field.

10. The method of claim 9, further including the step of encoding a video line with scrambling information indicative of the signal selected in the step of selecting.

11. The method of claim 9, further including the step of adding a scrambling signal onto each of the plurality of video lines before the step of delaying the first video line.

12. A method of descrambling a plurality of scrambled video lines in a raster scan video image for a video field comprising the steps of:
(1) delaying a first scrambled video line an amount of time equal to the horizontal line scan time for the raster scan video field to provide a delayed first scrambled video line;
(2) inverting the delayed first scrambled video line to provide an inverted delayed first scrambled video line;
(3) selecting one of,
  (a) the delayed first scrambled video line, or
  (b) the inverted delayed first scrambled video line, or
  (c) a zero-level signal
(4) adding a second scrambled video line to the selected one of (a), (b), or (c) and to a feedback signal to produce a descrambled video line;
(5) developing the feedback signal from a delayed descrambled video line; and
(6) repeating steps (1)–(5) for each of the plurality of scrambled video lines of the video field.

13. The method of claim 12, wherein the step of developing the feedback signal includes the steps of inverting the delayed descrambled video line and choosing one of (a) the delayed descrambled video line, or (b) the inverted delayed descrambled video line, or (c) a zero-level signal, as the feedback signal.

14. The method of claim 13, wherein the scrambled video signal includes scrambling information indicative of the manner in which scrambled video signal was scrambled and including the steps of detecting the scrambling information and using the detected scrambling information in the steps of selecting and choosing.

15. The method of claim 14, wherein the scrambled video signal includes a scrambling signal added thereto and including the step of removing the scrambling signal from the descrambled video line after the step of adding.

16. An apparatus for scrambling a video signal having first and second components to produce a scrambled video signal, including:
means for delaying the first component in time to produce a delayed first component;
means coupled to the delaying means for combining the second component with the delayed first component to produce the scrambled video signal.

17. The apparatus of claim 16, wherein the combining means includes means for adding the second component to the delayed first component.

18. The apparatus of claim 16, wherein the combining means includes means for subtracting one of the delayed first component and the second component from the other of the delayed first component and the second component.

19. The apparatus of claim 16, wherein the combining means includes means for inverting one of the second component and the delayed first component to produce an inverted second component or an inverted delayed first component and means for adding one of the following groups:
(a) the second component and the delayed first component, or
(b) the second component and the inverted delayed first component, or
(c) the inverted second component and the delayed first component.

20. The apparatus of claim 19, wherein the combining means further includes means for choosing the second component as the scrambled video signal.

21. The apparatus of claim 19, wherein the first component comprises an active video portion of a first horizontal video line and the second component comprises an active video portion of a second horizontal video line.

22. The apparatus of claim 21, wherein the combining means includes means for inverting the delayed first component, means for choosing one of (a) the delayed first component, or (b) the inverted delayed first component, or (c) a zero-level signal, and means for adding the second component to the chosen one of the delayed first component, the inverted delayed first component or the null signal.

23. The apparatus of claim 16, wherein the video signal has a horizontal line scan time for a raster scan video field and the delaying means delays the first component an amount in time equal to the horizontal line scan time for the raster scan video field.

24. The apparatus of claim 16, further including means coupled to the delaying means for adding a scrambling signal onto one of the first component and the second component.

25. The apparatus of claim 16, further including means coupled to the combining means for adding scrambling information indicative of the operation of the combining means to the scrambled video signal.

26. An apparatus for descrambling a scrambled video signal having first and second scrambled components to produce a first component of a descrambled video signal having first and second components, comprising:

means for delaying the first scrambled component in time;

means for combining the delayed first scrambled component, the second scrambled component and a feedback signal to produce the first component of the descrambled video signal; and means responsive to the second component of the descrambled video signal for producing the feedback signal.

27. The apparatus of claim 26, wherein the combining means includes means for adding the delayed first scrambled component and the second scrambled component.

28. The apparatus of claim 26, wherein the combining means includes means for subtracting one of the delayed first scrambled component and the second scrambled component from the other of the delayed first scrambled component and the second scrambled component.

29. The apparatus of claim 26, wherein the combining means includes means for inverting one of the second scrambled component and the delayed first scrambled component to produce an inverted second scrambled component or an inverted delayed first scrambled component and means for adding one of the following groups:

(a) the second scrambled component and the delayed first scrambled component, or (b) the second scrambled component and the inverted delayed first scrambled component, or (c) the inverted second scrambled component and the delayed first scrambled component.

30. The apparatus of claim 29, wherein the producing means includes further delaying means for delaying the second component of the descrambled video signal.

31. The apparatus of claim 30, wherein the delaying means delays the first scrambled component a first amount of time and the further delaying means delays the second component of the descrambled video signal an amount of time equal to twice the first amount of time.

32. The apparatus of claim 30, wherein the producing means includes further means for inverting the delayed second component of the descrambled video signal and means for choosing one of the delayed second component of the descrambled video signal and the inverted delayed second component of the descrambled video signal as the feedback signal.

33. The apparatus of claim 32, wherein the producing means includes further means for choosing a zero-level signal as the feedback signal.

34. The apparatus of claim 33, wherein the first scrambled component comprises an active video portion of a first scrambled horizontal video line and the second scrambled component comprises an active video portion of a second scrambled horizontal video line.

35. The apparatus of claim 26, wherein one of the first and second scrambled components includes a scrambling signal added thereto and including means coupled to the combining means for removing the scrambling signal from the first component of the descrambled video signal.

36. The apparatus of claim 26, wherein the scrambled video signal includes scrambling information indicative of the manner in which the scrambled video signal was generated and including means for detecting the scrambling information indicative of the manner in which the scrambled video signal was generated, wherein the combining means and the producing means are responsive to the detected scrambling information indicative of the manner in which the scrambled video signal was generated.

37. A method of transmitting a video signal having first and second original components to develop a reproduced video signal having first and second reproduced components, comprising the steps of:

delaying the first original component of the video signal in time to produce a delayed first original component;

combining the second original component of the video signal with the delayed first original component to produce a portion of a scrambled video signal having first and second scrambled components;

transmitting the scrambled video signal;

receiving the transmitted scrambled video signal;

delaying the first scrambled component of the received scrambled video signal in time;

combining the delayed first scrambled component of the received scrambled video signal, the second scrambled component of the received scrambled video signal and a feedback signal to develop the first reproduced component of the reproduced video signal; and delaying the second reproduced component of the reproduced video signal to produce the feedback signal.

38. The method of claim 37, wherein the step of combining the second original component of the video signal with the delayed first original component includes one of the steps of adding the second original component to the delayed first original component and subtracting one of the second original component and the delayed first original component from the other of the second original component and the delayed first original component, wherein the step of combining the delayed first scrambled component of the received scrambled video signal, the second scrambled component of the received scrambled video signal and a feedback signal includes one of the steps of adding the second scrambled component to the delayed first scrambled component and subtracting one of the second scrambled component and the delayed first scrambled component from the other of the second scrambled component and the delayed first scrambled component and wherein the step of combining the delayed first scrambled component of the received scrambled video signal, the second scrambled component of the received scrambled video signal and a feedback signal further includes the steps of inverting the delayed second reproduced component and choosing one of the delayed second reproduced component and the inverted delayed second reproduced component as the feedback signal.

* * * * *